(12) United States Patent
Rajput et al.

(10) Patent No.: US 10,146,530 B1
(45) Date of Patent: Dec. 4, 2018

(54) SIMULATING AND EVALUATING CODE BRANCH MERGE

(71) Applicant: International Business Machines Corporation, Armonk, NY (US)

(72) Inventors: Nitendra Rajput, Gurgaon (IN); Padmanabha Venkatagiri Seshadri, Mysore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/647,951

(22) Filed: Jul. 12, 2017

(51) Int. Cl.
*G06F 8/71* (2018.01)
*G06F 8/75* (2018.01)

(52) U.S. Cl.
CPC . *G06F 8/71* (2013.01); *G06F 8/75* (2013.01)

(58) Field of Classification Search
CPC ..................................... G06F 8/71; G06F 8/75
USPC ......................................................... 717/170
See application file for complete search history.

(56) References Cited

U.S. PATENT DOCUMENTS

| | | | |
|---|---|---|---|
| 5,481,722 A | 1/1996 | Skinner | |
| 5,671,417 A * | 9/1997 | Miclette | G06F 9/44521 717/130 |
| 5,995,736 A * | 11/1999 | Aleksic | G06F 17/5022 717/106 |
| 6,138,270 A * | 10/2000 | Hsu | G06F 8/34 717/125 |
| 6,226,652 B1 | 5/2001 | Percival et al. | |
| 6,415,299 B1 | 7/2002 | Baisley et al. | |
| 6,839,895 B1 * | 1/2005 | Ju | G06F 8/4442 717/144 |
| 6,904,588 B2 | 6/2005 | Reddy et al. | |
| 7,069,547 B2 | 6/2006 | Glaser | |
| 7,290,251 B2 | 10/2007 | Livshits | |

(Continued)

FOREIGN PATENT DOCUMENTS

EP     1849069 B1 *  6/2017

OTHER PUBLICATIONS

Nikoukaran et al., "A hierarchical framework for evaluating simulation software", 1999, Elsevier Science.*

(Continued)

*Primary Examiner* — Wei Y Zhen
*Assistant Examiner* — Junchun Wu
(74) *Attorney, Agent, or Firm* — Ference & Associates LLC

(57) ABSTRACT

One embodiment provides a method, including: receiving a request to merge at least one code branch with a first code branch, wherein the at least one code branch and the first code branch comprise different versions of software code; and simulating the merge via: identifying the differences between the at least one code branch and the first code branch; generating a differences list comprising a list of (i) added code snippets, (ii) deleted code snippets, and (iii) changed code snippets, wherein code snippets are clustered in the differences list by difference chunks comprising connected code snippets; and building a relationship graph comprising a plurality of nodes and a plurality of edges, wherein each of the plurality of nodes represent a difference chunk and wherein each of the plurality of edges comprise a relationship between two of the plurality of nodes; each of the plurality of edges comprise a cost vector.

20 Claims, 3 Drawing Sheets

(56) References Cited

U.S. PATENT DOCUMENTS

| | | | |
|---|---|---|---|
| 7,487,471 B2 | 2/2009 | Wu | |
| 7,895,592 B2 | 2/2011 | Subramanian et al. | |
| 8,046,751 B1* | 10/2011 | Avadhanula | G06F 8/75 717/104 |
| 8,078,589 B2 | 12/2011 | Cote et al. | |
| 8,286,132 B2 | 10/2012 | Yuan et al. | |
| 8,332,827 B2 | 12/2012 | Edde et al. | |
| 8,352,914 B2 | 1/2013 | Sarkar et al. | |
| 8,352,928 B2* | 1/2013 | Kimura | G06F 8/443 717/128 |
| 8,429,610 B2 | 4/2013 | Clemm et al. | |
| 8,683,449 B2 | 3/2014 | Singh et al. | |
| 8,719,786 B2 | 5/2014 | Waddington | |
| 9,052,983 B2 | 6/2015 | Farchi et al. | |
| 9,086,885 B2 | 7/2015 | Canter et al. | |
| 9,128,804 B2 | 9/2015 | Gores | |
| 9,152,412 B2 | 10/2015 | Cowan et al. | |
| 9,158,658 B2 | 10/2015 | Bigwood et al. | |
| 9,207,933 B2* | 12/2015 | Bostick | G06F 8/71 |
| 9,292,419 B1* | 3/2016 | Kintali | G06F 11/3676 |
| 9,519,631 B2 | 12/2016 | Kilian et al. | |
| 9,557,965 B2 | 1/2017 | Santos Luaces | |
| 2004/0177343 A1 | 9/2004 | McVoy et al. | |
| 2005/0028143 A1* | 2/2005 | Aridor | G06F 8/71 717/122 |
| 2006/0106889 A1 | 5/2006 | Mannby | |
| 2007/0283322 A1* | 12/2007 | Hsu | G06F 8/34 717/113 |
| 2009/0083713 A1* | 3/2009 | Mori | G06F 8/4441 717/127 |
| 2011/0010689 A1* | 1/2011 | Plewinski | G05B 17/02 717/108 |
| 2011/0209135 A1* | 8/2011 | Sakuma | G06F 8/71 717/170 |
| 2012/0005661 A1* | 1/2012 | Johnston | G06F 9/44521 717/148 |
| 2012/0324435 A1* | 12/2012 | Somani | G06F 8/30 717/170 |
| 2013/0290940 A1 | 10/2013 | Palanisamy et al. | |
| 2016/0342720 A1 | 11/2016 | Veneris et al. | |

OTHER PUBLICATIONS

Nguyen et al., "Accuracy and Speed-up of Parallel Trace-Driven Architectural Simulation", 1997, IEEE.*

Yardimci et al., "Dynamic Parallelization and Mapping of Binary Executables on Hierarchical Platforms", 2006, ACM.*

Hovland et al., "Parallel simulation of compressible flow using automatic differentiation and PETSc", 2001, Elsevier Science.*

Balarin et al., "Specification, Synthesis, and Simulation of Transactor Processes", Oct. 2007, IEEE, vol. 26, No. 10.*

Bixin Li et al., "A survey of code-based change impact analysis techniques", Software Testing, Verification and Reliability, 2012, 34 pages, John Wiley & Sons, Ltd.

Xiaobing Sun et al., "A Comparative Study of Static CIA techniques", Internetware '12, Oct. 30-31, 2012, Qingdao, China, 9 pages, ACM Digital Library.

Xiaobing Sun et al., "Static change impact analysis techniques: A comparative study", The Journal of Systems and Software, Aug. 2015, 14 pages, Elsevier Inc.

Mario Luis Guimaraes et al., "Improving Early Detection of Software Merge Conflicts", ICSE '12, Proceedings of the 34th International Conference on Software Engineering, Jun. 2-9, 2012, Zurich, Switzerland, 11 pages, IEEE Digital Library.

Mehdi Ahmed-Nacer et al., "Evaluating Software Merge Quality", 18th International Conference on Evaluation and Assessment in Software Engineering, May 2014, London, United Kingdom, 11 pages, ACM Digital Library.

Rohan Padhye et al., "NeedFeed: Taming Change Notifications by Modeling Code Relevance", ASE '14, Sep. 15-19, 2014, Vasteras, Sweden, 11 pages, ACM Digital Library.

Martin Dias et al., "Delta Impact Finder: Assessing Semantic Merge Conflicts with Dependency Analysis", IWST '15, Jul. 15-16, 2015, Brescia, Italy, 7 pages, ACM Digital Library.

Hung Viet Nguyen et al., "Detecting Semantic Merge Conflicts with Variability-Aware Execution", ESEC/FSE '15, Aug. 30-Sep. 4, 2015, Bergamo, Italy, 4 pages, ACM Digital Library.

Christian Bird et al., "Assessing the Value of Branches with What-if Analysis", SIGSOFT '12/FSE-20, Nov. 11-16, 2012, Cary, North Carolina, USA, 11 pages, ACM Digital Library.

Veronica Uquillas-Gomez et al., "Supporting Streams of Changes during Branch Integration", Science of Computer Programming, Aug. 28, 2014, 24 pages, Elsevier.

Jacob T. Biehl et al., "FASTDash: A Visual Dashboard for Fostering Awareness in Software Teams", CHI 2007, Apr. 28-May 3, 2007, San Jose, California, USA, 10 pages, ACM Digital Library.

Veronica Uquillas-Gomez et al., "Visually Characterizing Source Code Changes", Science of Computer Programming, Sep. 15, 2013, 31 pages, Elsevier.

Marco D'Ambros et al., "BugCrawler: Visualizing Evolving Software Systems", CSMR '07, 11th European Conference on Software Maintenance and Reengineering, Mar. 21-23, 2007, Amsterdam, The Netherlands, 2 pages, IEEE Digital Library.

Mircea Lungu et al., "The Small Project Observatory: Visualizing software ecosystems", Science of Computer Programming, 2010, 12 pages, Elsevier.

Veronica Uquillas-Gomez et al., "Ring: a Unifying Meta-Model and Infrastructure for Smalltalk Source Code Analysis Tools", Computer Languages, Systems and Structures, Oct. 7, 2011, 30 pages, Elsevier.

Daniel Rozenberg et al., "Comparing Repositories Visually with RepoGrams", MSR '16, May 14-15, 2016, Austin, Texas, USA, 12 pages, ACM Digital Library.

Marco D'Ambros et al., "The Evolution Radar: Visualizing Integrated Logical Coupling Information", MSR '06, May 22-23, 2006, Shanghai, China, 7 pages, ACM Digital Library.

Larissa Leite et al., "UEDashboard: Awareness of Unusual Events in Commit Histories", ESEC/FSE 2015, Proceedings of the 2015 10th Joint Meeting on Foundations of Software Engineering, Aug. 30-Sep. 4, 2015, Bergamo, Italy, 4 pages, ACM Digital Library.

Sven Apel et al., "Semistructured Merge: Rethinking Merge in Revision Control Systems", ESEC/FSE '11, Sep. 5-9, 2011, Szeged, Hungary, 11 pages, ACM Digital Library.

Filip Van Rysselberghe et al., "Studying Software Evolution Information by Visualizing the Change History", ICSM '04, Proceedings of the 20th IEEE International Conference on Software Maintenance, Sep. 11-14, 2004, Chicago, Illinois, USA, 11 pages, IEEE Digital Library.

Jonathan Protzenko et al., "Implementing Real-Time Collaboration in TouchDevelop using AST Merges", MobileDeLi '15, Oct. 26, 2015, Pittsburgh, PA, USA, 3 pages, ACM Digital Library.

* cited by examiner

SIMULATING AND EVALUATING CODE BRANCH MERGE

BACKGROUND

Generating and updating software code is generally very complicated with the software code having many different software pieces. For example, one piece of software may be directed to a particular feature of the overall software code. As an example, if the overall software code is directed towards an application, a piece of the software code may be directed to a particular function within the application. The software code is generally stored in a software repository that allows different users to access the software code in order to edit (e.g., add, delete, change, etc.) a particular piece or function of the software.

Typically, when working on a piece of the software code, the user or programmer may create a code branch. Creation of a code branch includes duplicating the selected or requested object or piece of code and creating a branch of the duplicated object that allows modification to the branch, but does not change the primary object. Thus, modification of the piece of code can happen in parallel to other modifications of similar or other branches. The creation of a code branch allows the user to work on the chosen piece of code without affecting the other pieces of software code. Additionally, the user can work on the piece of code without preventing other users from working on the same piece of code or other pieces of code which may be dependent on the code the user is modifying.

BRIEF SUMMARY

In summary, one aspect of the invention provides a method, comprising: utilizing at least one processor to execute computer code that performs the steps of: receiving a request to merge at least one code branch with a first code branch, wherein the at least one code branch and the first code branch comprise different versions of software code; and simulating the requested merge via: identifying the differences between the at least one code branch and the first code branch; generating, based upon the identified differences, a differences list comprising a list of (i) added code snippets, (ii) deleted code snippets, and (iii) changed code snippets, wherein code snippets are clustered in the differences list by difference chunks, each of the difference chunks comprising connected code snippets; and building a relationship graph comprising a plurality of nodes and a plurality of edges, wherein each of the plurality of nodes represents at least a portion of a difference chunk and wherein each of the plurality of edges comprises a relationship between two of the plurality of nodes; each of the plurality of edges comprise a cost vector representing both (i) a dependency and (ii) a similarity between the two of the plurality of nodes connected by the corresponding edge.

Another aspect of the invention provides an apparatus, comprising: at least one processor; and a computer readable storage medium having computer readable program code embodied therewith and executable by the at least one processor, the computer readable program code comprising: computer readable program code that receives a request to merge at least one code branch with a first code branch, wherein the at least one code branch and the first code branch comprise different versions of software code; and computer readable program code that simulates the requested merge via: identifying the differences between the at least one code branch and the first code branch; generating, based upon the identified differences, a differences list comprising a list of (i) added code snippets, (ii) deleted code snippets, and (iii) changed code snippets, wherein code snippets are clustered in the differences list by difference chunks, each of the difference chunks comprising connected code snippets; and building a relationship graph comprising a plurality of nodes and a plurality of edges, wherein each of the plurality of nodes represents at least a portion of a difference chunk and wherein each of the plurality of edges comprises a relationship between two of the plurality of nodes; each of the plurality of edges comprise a cost vector representing both (i) a dependency and (ii) a similarity between the two of the plurality of nodes connected by the corresponding edge.

An additional aspect of the invention provides a computer program product, comprising: a computer readable storage medium having computer readable program code embodied therewith, the computer readable program code executable by a processor and comprising: computer readable program code that receives a request to merge at least one code branch with a first code branch, wherein the at least one code branch and the first code branch comprise different versions of software code; and computer readable program code that simulates the requested merge via: identifying the differences between the at least one code branch and the first code branch; generating, based upon the identified differences, a differences list comprising a list of (i) added code snippets, (ii) deleted code snippets, and (iii) changed code snippets, wherein code snippets are clustered in the differences list by difference chunks, each of the difference chunks comprising connected code snippets; and building a relationship graph comprising a plurality of nodes and a plurality of edges, wherein each of the plurality of nodes represents at least a portion of a difference chunk and wherein each of the plurality of edges comprises a relationship between two of the plurality of nodes; each of the plurality of edges comprise a cost vector representing both (i) a dependency and (ii) a similarity between the two of the plurality of nodes connected by the corresponding edge.

A further aspect of the invention provides a method, comprising: utilizing at least one processor to execute computer code that performs the steps of: identifying at least two code branches to be merged, wherein the at least two code branches contain different versions of software code; and simulating the merge before merging the at least two code branches and evaluating the merge results by providing inconsistencies between the at least two code branches; the evaluating the merge results comprising: (i) generating a list of inconsistencies resulting from added code segments, deleted code segments, and changed code segments; (ii) clustering code segments into chunks, wherein each of the chunks comprise linked code segments; (iii) determining dependencies and similarities between chunks; and (iv) building a relationship graph comprising (i) a plurality of nodes representing chunks and (ii) a plurality of edges connecting two of the plurality of nodes, wherein the relationship graph identifies both the dependencies and the similarities between chunks using a weight assigned to the edge connecting the chunks; and receiving a user selection to merge the at least two code branches, wherein the user selection is based upon the evaluated merge results.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
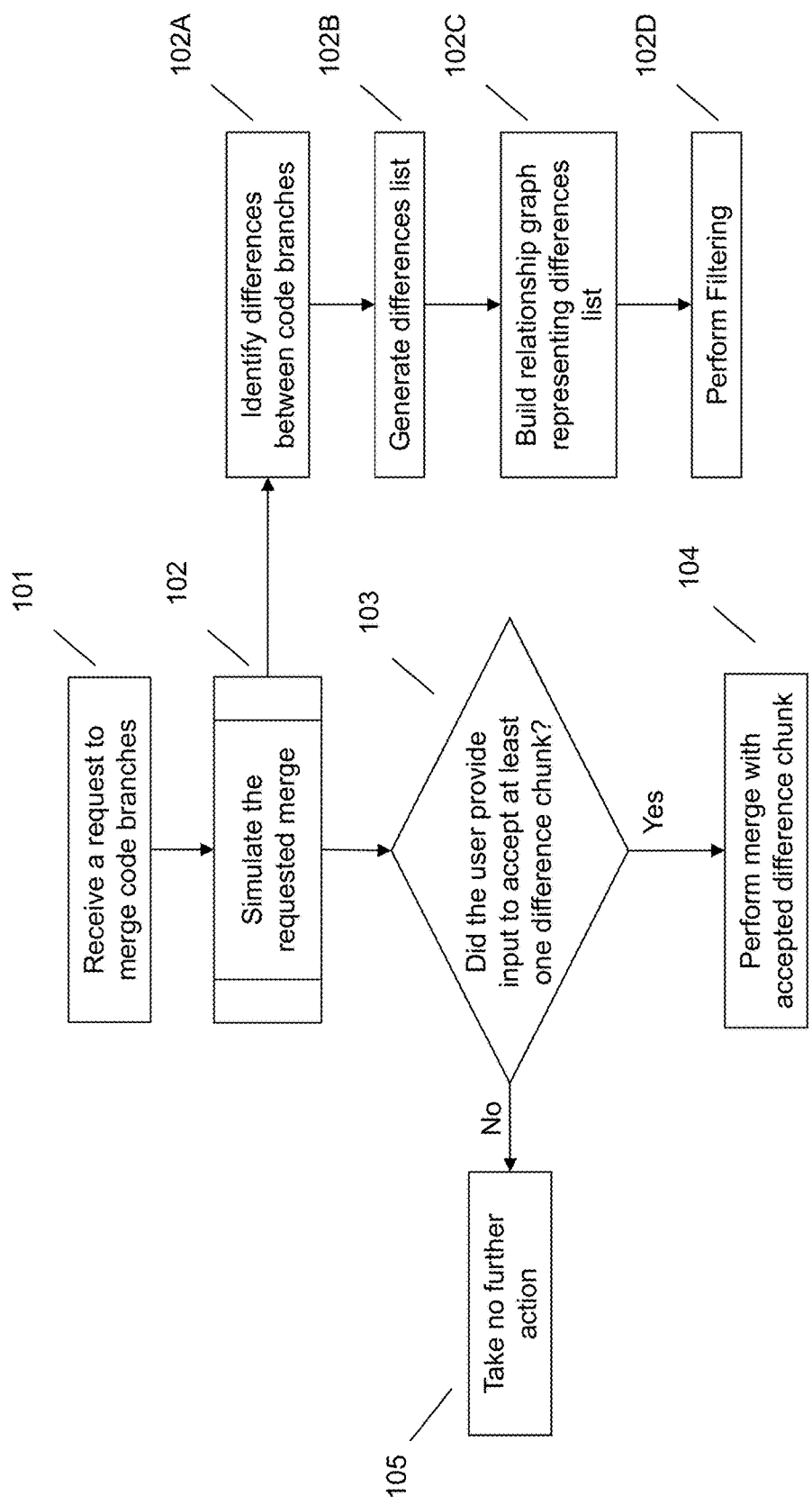
FIG. 1 illustrates a method of simulating and evaluating a branch code merge.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-3. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 3. In accordance with an example embodiment, all of the process steps, components and outputs discussed with respect to FIGS. 1-2 can be performed or utilized by way of a processing unit or units and system memory such as those indicated, respectively, at 16' and 28' in FIG. 3, whether on a server computer, a client computer, a node computer in a distributed network, or any combination thereof.

While the creation of code branches is very useful and helpful to testing, modifying, and generating software code, merging the branches, either with another branch or the main software code, can become tedious and cumbersome, due to the introduction of errors when merging. Merging the branches includes assimilating or integrating the branch with another branch or back with the main software code. When a user is manipulating code in a branch, the branch environment is essentially cut-off or isolated from other branches and the main software code. Therefore, the user may be unaware of dependencies or similarities between the branch that the user is manipulating and another branch or the main software code. Accordingly, even though the branch in isolation may not have any runtime errors or "bugs", when the branch is merged with another branch or back with the main software code, errors or "bugs" may be unwittingly introduced. For example, if a user changes a variable in the branch that also matches to a variable in another branch, the variable may no longer match when the branch is merged with the other branch, causing a mismatch error within the code.

One branch merge problem occurs when a branch has code or variables that are dependent on other code or variables contained within other branches. For example, one code segment may use a variable to perform a function. If the variable is changed, then the code segment that uses the variable to perform a function may be affected by the change to the variable. Since the manipulation occurs in an isolated environment (a branch) the user may be unaware of the dependency. Thus, when attempting to merge the branch with other branches or the software code containing the same code or variables, mismatch errors may occur. Code dependencies may occur within the same file or across different files. Additionally, dependencies may be direct dependencies or indirect dependencies. Direct dependencies occur when one code segment is directly dependent on another code segment. Indirect dependencies occur when two or more code segments are dependent on the same resource or code segment.

Another branch merge problem occurs when code segments are similar between different code pieces. Similar code segments may have at least some of the same or similar variables or code segments. However, similar code segments are not dependent on each other. In other words, similar code segments may use the same or similar code or variables, but one code segment is not dependent on the output of the other code segment. An example, similar code segments may have similar classes, but are dependent on an external library rather than each other. As with branches with having dependencies, when a branch having similar code to another branch is modified during the merge of the branches, errors may be introduced.

Another problem with branch merges is that traditional branch merges are an all-or-nothing proposition. In other words, the user can either merge the entire branch or not merge the branch at all. The user cannot choose to only merge sub-sections of the branch. For example, if a user creates different versions of the branch in an effort to reduce the number of introduced errors or in order to test different changes, the user cannot choose different sub-sections of each version to merge. The user must choose one entire version to merge and then make any additional edits after that version has been merged with the other branch or software code.

Accordingly, an embodiment provides a method of simulating and evaluating branch code merges before the merge is completed using a visual programming language. The system may receive a request to merge at least one code branch with another or first code branch. For example, a user may have multiple code branches all including different versions of the same software code. In other words, a user may generate multiple branches of the same code and each branch may contain a different version of the code, where a version includes changes different from another branch or the original software code. Upon receiving the request for merging the one or more branches, the system may simulate and evaluate the merge.

Simulating the merge may include identifying the differences between the code branches selected or identified for merging. The system may then generate a differences list from the identified differences. The differences list, or "diff", may include a listing of added code snippets, deleted code snippets, and changed code snippets. The code snippets may be clustered in the differences list by difference chunks. The difference chunks may include clusters of connected components or code snippets. The system may then generate or build a relationship graph to represent the relationships between difference chunks, including difference chunks in the same file and difference chunks across files.

The relationship graph may be a visual representation of the relationship between the difference chunks. At least a portion of each difference chunk may be represented by a node within the relationship graph. A difference chunk may also be represented by more than one node. For example, if a difference chunk includes more than one code segment, each code segment may be represented by a different node within the relationship graph. The graph may also include edges which represent a connection between two of the nodes within the graph. Each of the edges may also include a cost vector or weight which represents a dependency and a similarity between the two corresponding nodes. Using the relationship graph, a user can identify the relationship between different sub-sets of the two or more code branches. Additionally, the user can select nodes on the relationship graph to be added to the merge, filter unusable or unwanted nodes, or edit code before the branches are merged.

Such a system provides a technical improvement over current systems for merging code branches. Traditional systems do not allow a user to simulate and evaluate the branch merge before the merge is completed. Using the systems and methods as described herein, the user can simulate a merge and identify any potential errors that may be introduced with the merge. Additionally, the systems and methods as described herein track code dependencies and similarities which allow the system to identify potential errors in the case that the branch is merged with another branch or the software code. The system generates a relationship graph which provides a visual display of dependencies and similarities between different code segments and branches. Additionally, the user can select sub-sets of the branches to merge rather than having to merge the entire branch. Thus, the systems and methods as described herein provide a technique that reduces the amount of errors introduced during a branch merge, making the technique more efficient and less tedious than traditional techniques for merging code branches.

Figure 2:
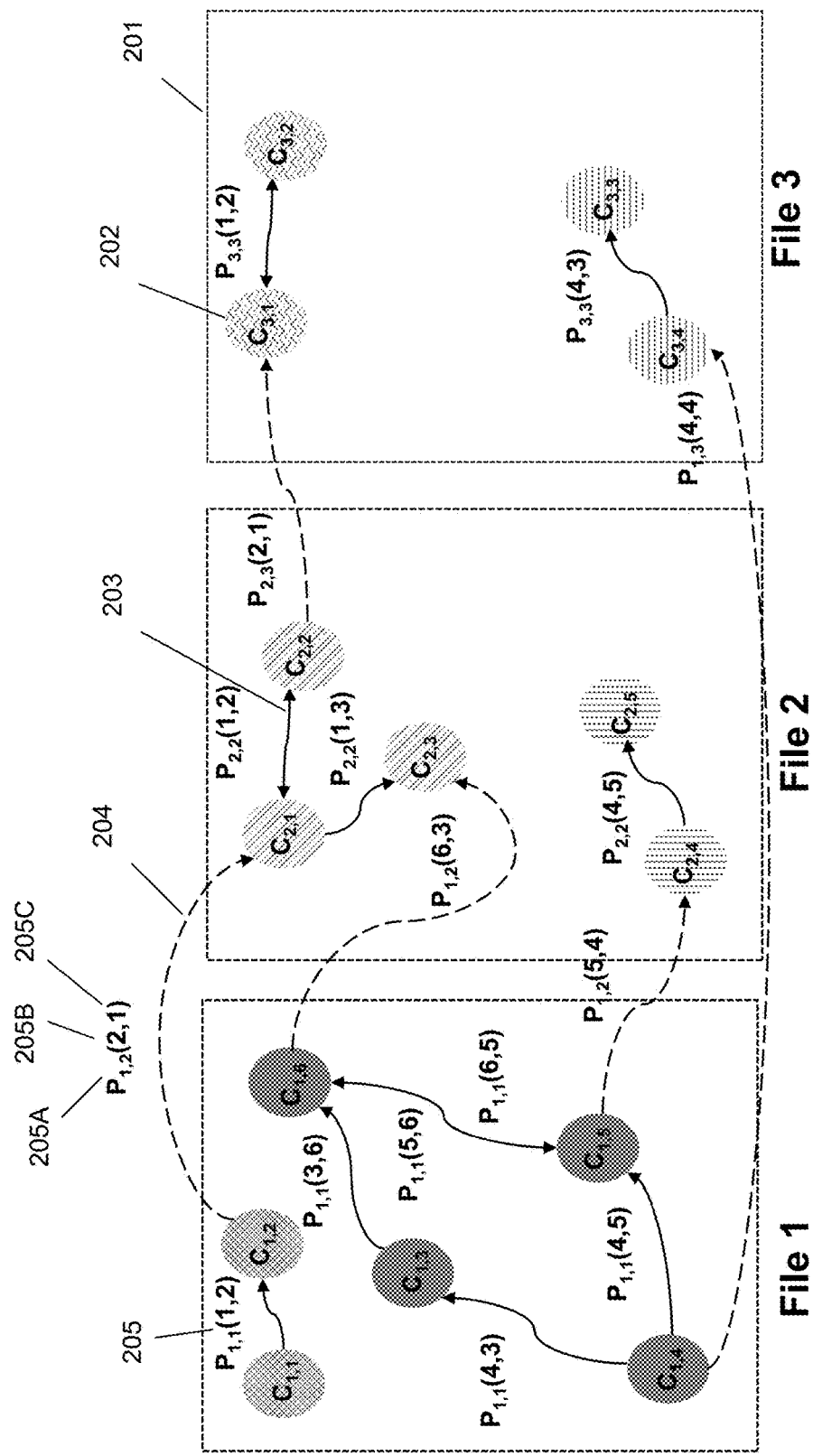
FIG. 2 illustrates an example relationship graph generated using the systems and methods as described herein.

Referring now to FIG. 1, at 101, the system may receive a request to merge code branches. For example, a user may indicate that a source branch should be merged with a target branch. As another example, a user may select two or more versions of the same branch for merging. Each branch may contain different versions of the same software code. In other words, each branch may have been created from the same main or original software code. However, each branch may contain different changes from each other branch. Thus, each branch contains a version of the software code that is different from the other branches or the original software code. One or more of the branches may also include simulated code. For example, using the systems and techniques described herein a user can simulate a merge. This simulation may generate a simulated code branch that includes the simulated merged code. The user may then select this simulated code branch as one of the branches for merging.

At 102, the system may simulate the requested merge, for example, using a visual programming language. Simulating the requested merge may include mimicking the merge before actually merging the branches. The merge results can then be evaluated by providing the differences between the two or more branches selected for merge. To perform the simulated merge, the system tracks the dependencies within a single file or across multiple files. For example, the system may identify a variable, code snippet, or code segment that is dependent on another variable, code snippet, or code segment. In order to track the dependencies, the system performs a dependency analysis within the file, or branch, and/or across the multiple files, or branches.

As discussed above, a direct dependency may include a variable or code segment that is directly dependent on another variable or code segment. For example, a variable that results from a function performed using another variable is directly dependent on said another variable. An indirect dependency occurs when two or more variables or code segments are dependent on the same resource. For example, two or more variables or code segments that are dependent on the same external library are indirectly dependent on each other. Dependencies may occur within the same file or across multiple files. Additionally, during the simulation of the merge, the system tracks the code segments having similarities. Similar code segments are code segments that have the same or similar variables or code snippets but that are not dependent on each other.

To simulate the requested merge, the system may, at 102A, identify the differences between the two or more branches selected for merging. The identification of the differences may be completed by comparing each branch to the other branches and designating the differences. At 102B the system may generate, based upon the identified differences, a differences list, or "diff". The differences list may include a listing of all the identified differences. For example, the differences list may indicate which code snippets were added, which code snippets were deleted, and which code snippets were changed. Within the differences list, the code snippets may be clustered into difference chunks. The difference chunks may include chunks of code which show the identified changes. Clustering of the code snippets may occur based upon a connection or similarity between the code snippets. In other words, each difference chunk may comprise connected code snippets or components.

The system may choose one of the branches as the target branch, for example, the original or main software code, or the user may indicate the target branch. The differences list may then be generated from the perspective of the target branch. For example, if the source branch adds a code snippet to the target branch, the differences list may indicate this as an added code snippet, whereas if the differences list was from the perspective of the source branch, the code snippet would be indicated as deleted.

At 102C the system may build a relationship graph, which may be a visual representation of the "diff" and the relationships between difference chunks included in the "diff". The relationship graph may be a multi-dimensional graph network. An example relationship graph is shown in FIG. 2. The relationship graph of FIG. 2 is shown as a black and white graph. However, as can be understood by one skilled in the art, different variations of the graph are possible, for example, as a colored graph, using different shapes, and the like. FIG. 2 illustrates a merge including three different files 201. The relationship graph may include a plurality of nodes, represented by circles in FIG. 2, for example, 202, and a plurality of edges, for example, 203 and 204, where each edge connects two nodes and illustrates a relationship between the two corresponding nodes. Each edge may include a cost vector or weight, for example, 205, which represents a dependency and similarity between the two nodes connected by the edge.

Each of the difference chunks included in the "diff" is included as one or more nodes within the relationship graph. The nodes belonging to the same difference chunk may be represented by the same color, pattern, shape, or the like in the graph. In the example of FIG. 2, the nodes belonging to the same difference chunks are represented by the same pattern. The dashed lines between nodes represent inter-file edges, whereas the solid lines between nodes represent intra-file edges.

The cost vectors or weights included in the edges include a subscript 205A denoting the file of the source node and the destination node. The cost vectors also include a dependency identifier 205B and a similarity identifier 205C, as described in more detail below. For nodes having a dependency only, the dependency identifier in the cost vector is labeled as "I" for a direct dependency and between 0 and I for an indirect dependency and the similarity identifier is "0" in the example of FIG. 2. For nodes having a similarity only, the dependency identifier is "0" and the similarity identifier is between 0 and 1. For nodes having a combination of dependency and similarity, both the dependency and similarity identifiers are between 0 and I.

In order to create and add the cost vectors or weights to the edges between the nodes, the system first identifies direct inter/intra-file dependencies. To identify direct inter/intra-file variable and class dependencies, the source files of the target branch are tokenized using Abtract Syntax Tree (AST). The tokens are then used to create a syntax dictionary for each source file. Tokens for each of the difference chunks are identified and indexed. If a variable and/or class definition appears in one chunk and is referenced in another chunk, then the cost vector for the edge is identified as a direct dependency. To identify direct inter/intra-file dependency methods, call graphs for each source file are computed. If the functions appearing the caller-callee links in the call graph appear in the difference chunk pair, then the difference chunks are identified as directly dependent in the cost vector for the node pairs.

To identify indirect inter/intra-file dependencies, the system must determine how the source file module and related module are related with respect to the resource accessed by both modules. The source text is first tokenized and converted into a vector of syntactic words. Training data can be derived from the syntax documentation of the programming language used in the source files, resource file syntax, and documentation of the libraries used by the system. The training data can then be applied to the syntactic words to create numerical vectors which keep syntax synonyms clustered. The module type can then be classified using the vectors as features. To derive the module function which respect to the resource, the vectors of the source files are filtered with respect to the resource. Using the filtered words, the source files can be classified as modules with functionality. If the source file module is the reader and the related module is the writer, then the cost vector for the edge reflects the indirect dependency.

To identify inter/intra-file similarities the difference chunks are tokenized and converted into a vector of words. Unlike the indirect dependencies, which are converted to a vector of syntactic words, the similarities are all words, not just the syntactic words. The system then derives the training data, extracts semantics, and generates numerical vectors in a method similar to that used with the indirect dependencies. To get the text similarity between the difference chunks, text similarity metrics may be used with respect to the numerical vectors. The similarity identifier in the cost vector may then be updated to reflect the similarity between the difference chunks. The system may then perform pre-filtering or post-filtering at 102D, as discussed in more detail below.

Once the relationship graph has been created, the system may identify whether the user provided input to accept or add at least one difference chunk as represented on the relationship graph at 103. A benefit of the relationship graph and simulated merge as described herein is that a user can select only a sub-set of difference chunks or changes to be added or merged. In other words, the user can selectively introduce some changes from one branch and not another, introduce different changes from multiple branches, or the like. Accordingly, once the relationship graph has been created, the user may select difference chunks to be added to the merge. Selecting the difference chunks may include a user actually selecting the node on the graph to be added. Additionally or alternatively, the user may represent the sub-graphs in the form of a regular expression which can then be added.

If the user did not add or select a sub-set, entire file, or branch to merge, the system may take no further action at 105. However, if the user did add or select a sub-set, the system may perform the merge with the accepted difference chunk at 104. The merge may be completed with respect to the accepted difference chunk. Additionally or alternatively, the user may choose to filter difference chunks which were not selected. For example, different versions or difference chunks may have errors, for example, conflicts, syntax errors, or the like, or the version may not be relevant to the user. These versions could then be filtered out either using pre-analysis filtering or post-analysis filtering.

Pre-analysis filtering may include filtering versions by assigning conditions on the edges in the relationship graph. For example, the user could select a particular value for the dependency and/or similarity identifier. If the dependency and/or similarity identifier falls below this threshold, those edges and corresponding nodes may be filtered. Pre-analysis filtering may also be performed using graph analytic algorithms, for example, finding critical paths (e.g., finding most critical diff chunks to be applied, etc.), relative node centrality (e.g., identifying most important differ chunks for a particular file, etc.), graph clustering (e.g., finding closely related diff chunk clusters, etc.), and the like. Post-analysis filtering may allow a user to create custom analysis, for example, defect prediction, static code analysis, code smell detection, build/compile, and the like, to select only the versions that meet the selected analysis thresholds. For example, a user may select only the version(s) having the least number of defects, conflicts, errors, warnings, and the like.

After the filtering has been completed, the system may merge the selected branches. Additionally or alternatively, the user may edit the filtered software code created after the filtering step. At this point the user may edit the simulated version of the software code to produce a custom version of the code. For example, if the user wants to change a variable or other code segment, the user could do that at this time on the simulated version of the code before the final merge has been completed. Editing could also be script-based. Upon the user designating that editing is complete, the final merge may occur with the branches the user has selected, which may include the filtered and/or edited code branch.

Figure 3:
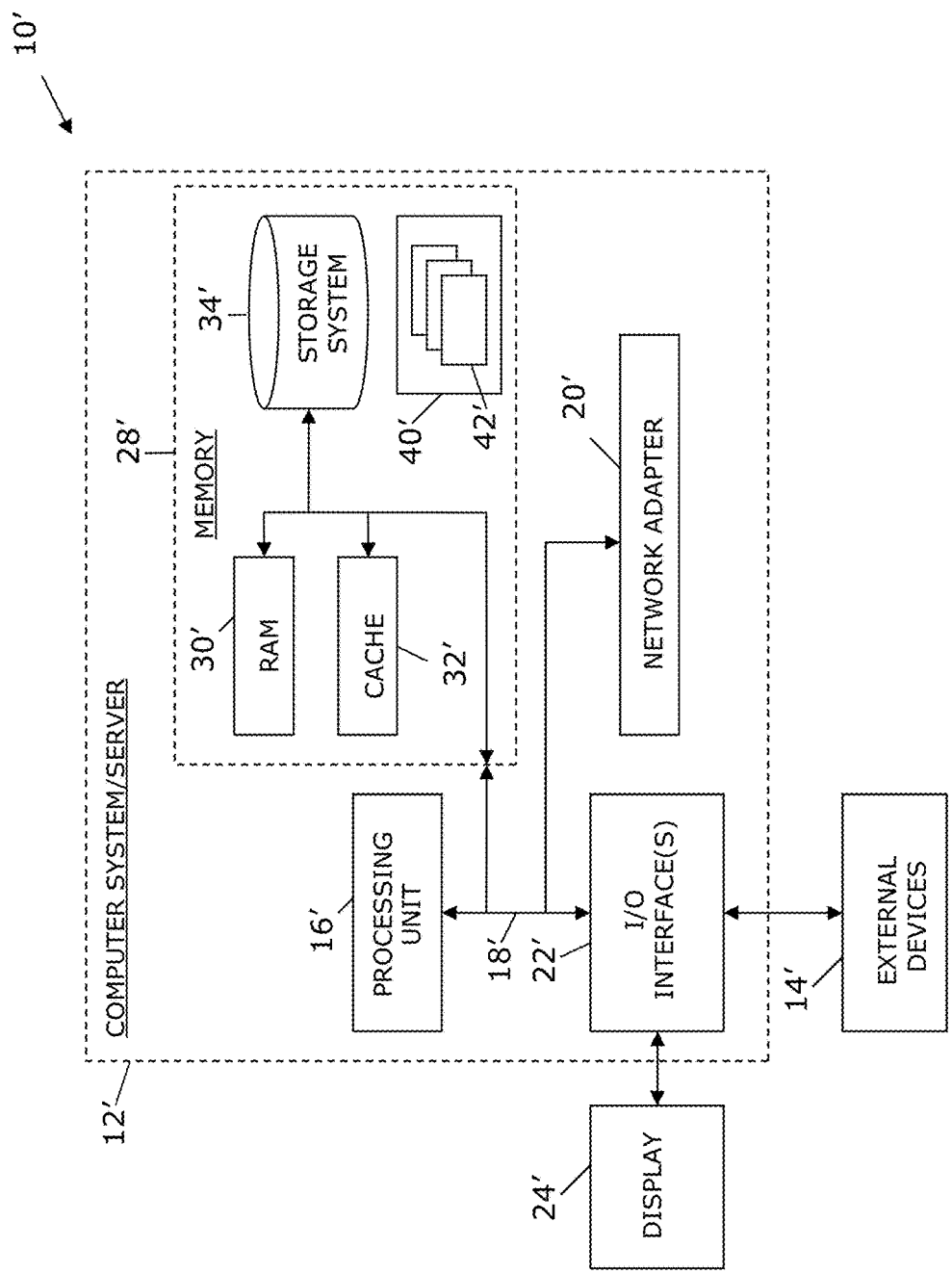
FIG. 3 illustrates a computer system.

As shown in FIG. 3, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
utilizing at least one processor to execute computer code that performs the steps of:
receiving a request to merge at least one code branch with a first code branch, wherein the at least one code branch and the first code branch comprise different versions of software code; and simulating the requested merge via:
identifying the differences between the at least one code branch and the first code branch; generating, based upon the identified differences, a differences list comprising a list of (i) added code snippets, (ii) deleted code snippets, and (iii) changed code snippets, wherein code snippets are clustered in the differences list by difference chunks, each of the difference chunks comprising connected code snippets; and
building a relationship graph comprising a plurality of nodes and a plurality of edges, wherein each of the plurality of nodes represents at least a portion of a difference chunk and wherein each of the plurality of edges comprises a relationship between two of the plurality of nodes;
wherein each of the plurality of edges comprises a cost vector representing both (i) a dependency and (ii) a similarity between the two of the plurality of nodes connected by the corresponding edge;
performing the merge with the difference chunks.

2. The method of claim 1, wherein the at least one code branch comprises a simulated branch comprising simulated code.

3. The method of claim 1, comprising identifying dependencies within the software code, wherein the dependencies comprise code segments that are dependent on other code segments.

4. The method of claim 1, comprising identifying similarities, within the software code, comprising code segments that are similar to each other.

5. The method of claim 1, comprising receiving user input selecting at least one difference chunk from the built relationship graph to be added to the first code branch.

6. The method of claim 5, comprising generating filtered software code by filtering difference chunks of code branches not selected to be added to the first code branch.

7. The method of claim 6, comprising receiving user input editing the filtered software code and merging the edited filtered software code to the first code branch.

8. The method of claim 1, wherein a direct dependency between two of the plurality of nodes is based upon use of the same variable in the difference chunks represented by the two of the plurality of nodes.

9. The method of claim 1, wherein an indirect dependency between two of the plurality of nodes is based upon the difference chunks represented by the two of the plurality of nodes accessing a shared resource.

10. The method of claim 1, wherein the simulating the requested merge is simulated in a visual programming language.

11. An apparatus, comprising:
at least one processor; and a computer readable storage medium having computer readable program code embodied therewith and executable by the at least one processor, the computer readable program code comprising:
computer readable program code that receives a request to merge at least one code branch with a first code branch, wherein the at least one code branch and the first code branch comprise different versions of software code; and
computer readable program code that simulates the requested merge via:
identifying the differences between the at least one code branch and the first code branch; generating, based upon the identified differences, a differences list comprising a list of (i) added code snippets, (ii) deleted code snippets, and (iii) changed code snippets, wherein code snippets are clustered in the differences list by difference chunks, each of the difference chunks comprising connected code snippets; and
building a relationship graph comprising a plurality of nodes and a plurality of edges, wherein each of the plurality of nodes represents at least a portion of a difference chunk and wherein each of the plurality of edges comprises a relationship between two of the plurality of nodes;
wherein each of the plurality of edges comprises a cost vector representing both (i) a dependency and (ii) a similarity between the two of the plurality of nodes connected by the corresponding edge;
performing the merge with the difference chunks.

12. A computer program product, comprising:
a computer readable storage medium having computer readable program code embodied therewith, the computer readable program code executable by a processor and comprising:
computer readable program code that receives a request to merge at least one code branch with a first code branch, wherein the at least one code branch and the first code branch comprise different versions of software code; and
computer readable program code that simulates the requested merge via:
identifying the differences between the at least one code branch and the first code branch; generating, based upon the identified differences, a differences list comprising a list of (i) added code snippets, (ii) deleted code snippets, and (iii) changed code snippets, wherein code snippets are clustered in the differences list by difference chunks, each of the difference chunks comprising connected code snippets; and
building a relationship graph comprising a plurality of nodes and a plurality of edges, wherein each of the plurality of nodes represents at least a portion of a difference chunk and wherein each of the plurality of edges comprises a relationship between two of the plurality of nodes;
wherein each of the plurality of edges comprises a cost vector representing both (i) a dependency and (ii) a similarity between the two of the plurality of nodes connected by the corresponding edge;
performing the merge with the difference chunks.

13. The computer program product of claim 12, comprising identifying dependencies within the software code, wherein the dependencies comprise code segments that are dependent on other code segments.

14. The computer program product of claim 12, comprising identifying similarities, within the software code, comprising code segments that are similar to each other.

15. The computer program product of claim 12, comprising receiving user input selecting at least one difference chunk from the built relationship graph to be added to the first code branch.

16. The computer program product of claim 15, comprising generating filtered software code by filtering difference chunks of code branches not selected to be added to the first code branch.

17. The computer program product of claim 16, comprising receiving user input editing the filtered software code and merging the edited filtered software code to the first code branch.

18. The computer program product of claim 12, wherein a direct dependency between two of the plurality of nodes is based upon use of the same variable in the difference chunks represented by the two of the plurality of nodes.

19. The computer program product of claim 12, wherein an indirect dependency between two of the plurality of nodes is based upon the difference chunks represented by the two of the plurality of nodes accessing a shared resource.

20. A method, comprising:
utilizing at least one processor to execute computer code that performs the steps of: identifying at least two code branches to be merged, wherein the at least two code branches contain different versions of software code;
simulating the merge before merging the at least two code branches and evaluating the merge results by providing inconsistencies between the at least two code branches;
the evaluating the merge results comprising:
(i) generating a list of inconsistencies resulting from added code segments, deleted code segments, and changed code segments;
(ii) clustering code segments into chunks, wherein each of the chunks comprise linked code segments;
(iii) determining dependencies and similarities between chunks; and (iv) building a relationship graph comprising (i) a plurality of nodes representing chunks and (ii) a plurality of edges connecting two of the plurality of nodes, wherein the relationship graph identifies both the dependencies and the similarities between chunks using a weight assigned to the edge connecting the chunks; and receiving a user selection to merge the at least two code branches, wherein the user selection is based upon the evaluated merge results;

performing the merge with the chunks.

\* \* \* \* \*